INVENTORS
WILLIAM R. LONG &
ZEBULON V. LONG

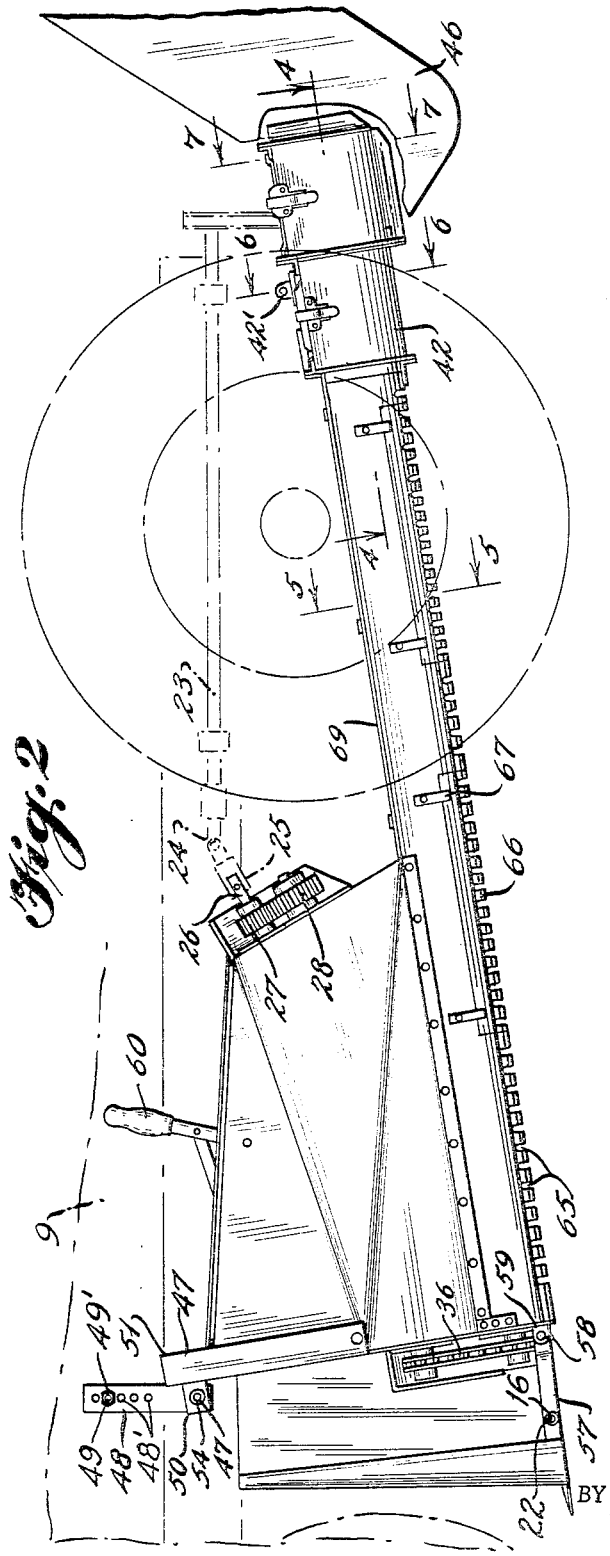

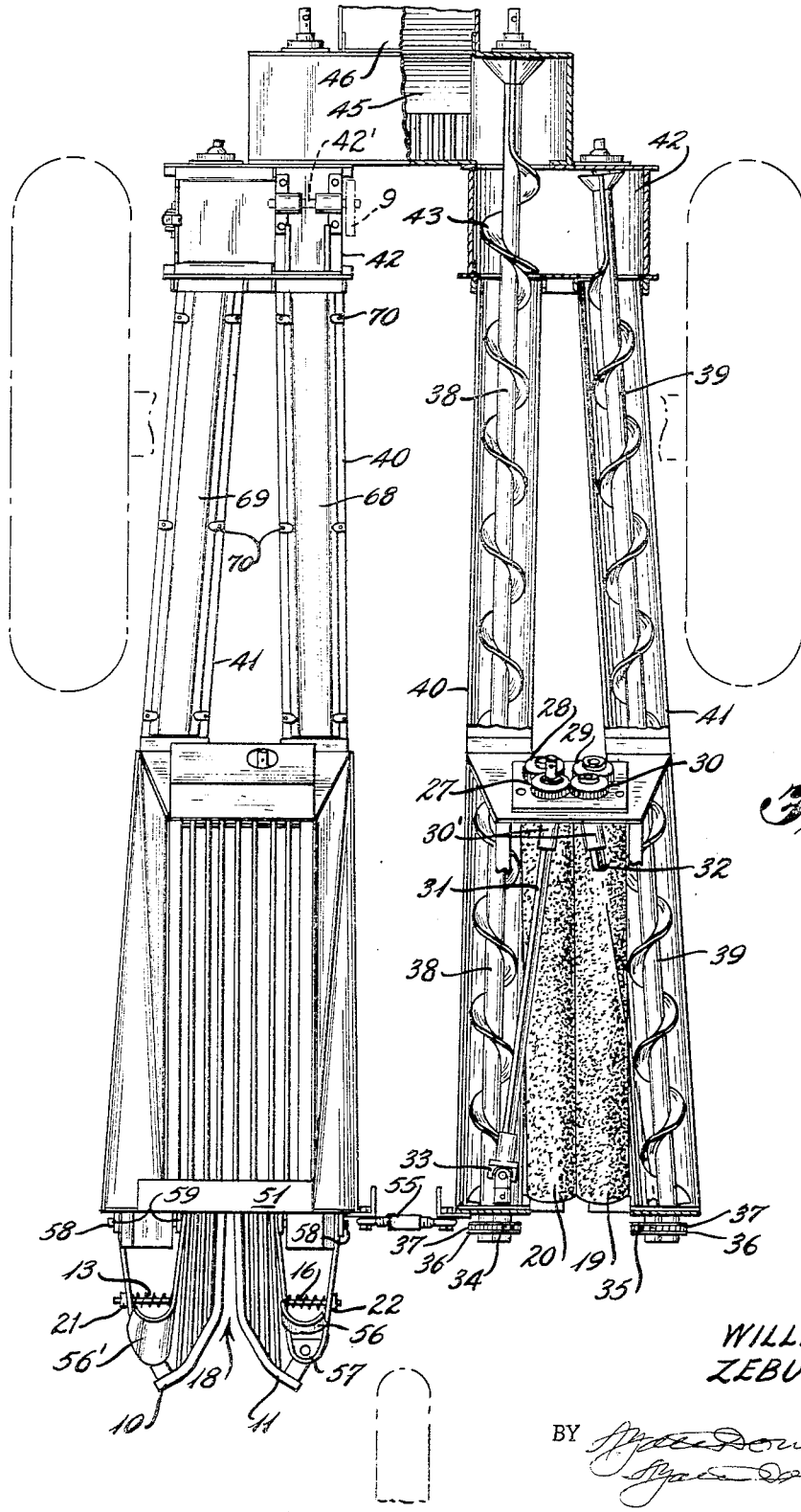

INVENTORS
WILLIAM R. LONG &
ZEBULON V. LONG

United States Patent Office 3,483,686
Patented Dec. 16, 1969

3,483,686
STRIPPER HEAD
William R. Long and Zebulon Vance Long, Tarboro, N.C., assignors to Long Manufacturing Company, Tarboro, N.C.
Filed July 29, 1966, Ser. No. 568,879
Int. Cl. A01d *45/18;* A01g *47/16*
U.S. Cl. 56—35                6 Claims

ABSTRACT OF THE DISCLOSURE

A stripper head applicable to a vehicle self-propelled or otherwise for stripping cotton from stalks on which grown with means for adjusting the stripper vertically and horizontally and after stripping transferring the cotton by suitable conveyors to a common collection area.

---

This invention relates to a stripper head applicable to a vehicle for use in stripping cotton from the stalk, and it is an object of the invention to provide a simplified practical stripper head which is an improvement over anything heretofore produced.

Another object of the invention is to provide a stripper head having means (1) for the simultaneous stripping of two or more rows of cotton from their stalks, (2) for conveying the cotton rearwardly, transferring it to inner conveyers, (3) for continuing its rearward movement and dumping the cotton into a common discharge hopper without cross auger means in the discharge hopper and (4) for mounting the strippers pivotally near their rear to the vehicle frame for minimum movement at the rear but maximum movement at the front whereby elevation and lateral adjustment is necessary.

Figure 1:
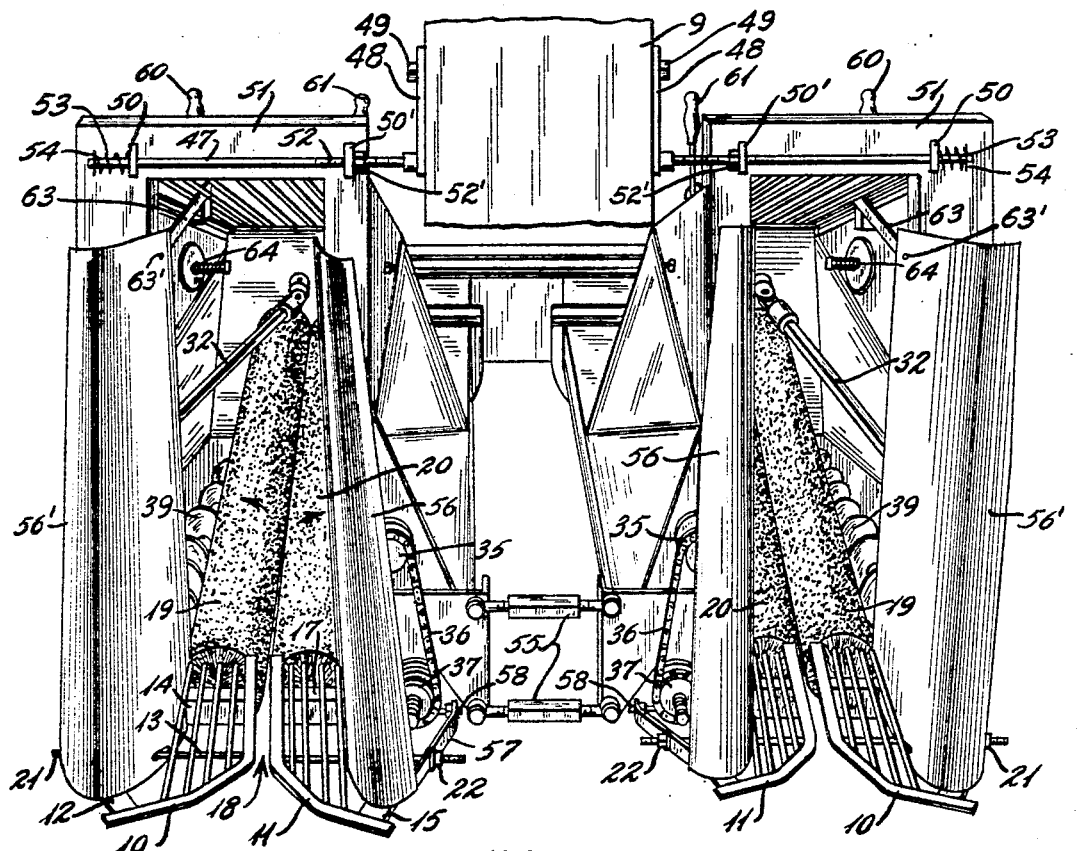
Figure 4:
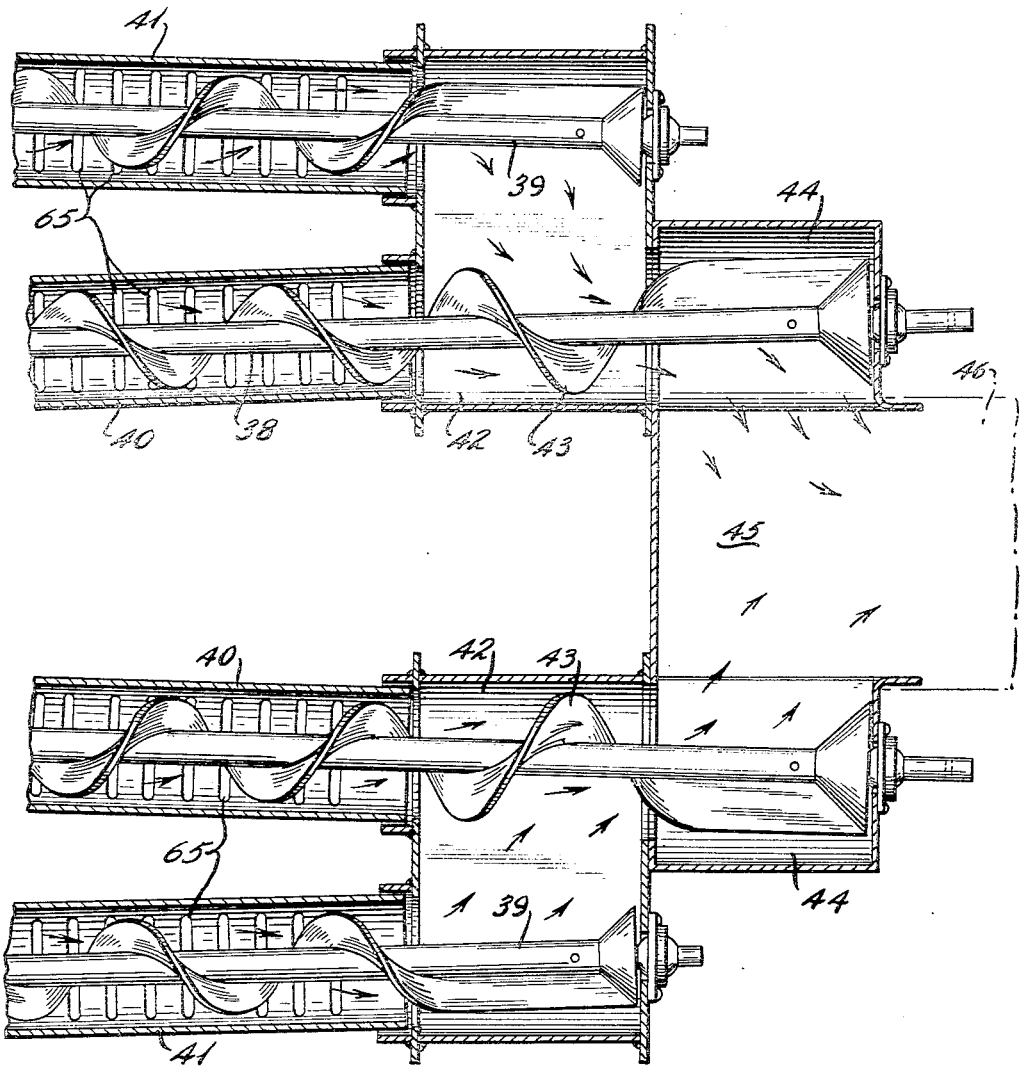
Figure 5:
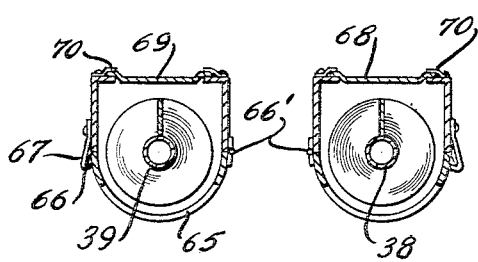

Other objects and advantages of the invention will be apparent from the following description considered in conjunction with the accompanying drawings in which:

FIG. 1 is a front elevation illustrating one application of the invention;

FIG. 2, a side elevation of the invention applied to a tractor illustrated in phantom lines;

FIG. 3, a top plan view with portions broken away to reveal the structure therebeneath;

FIG. 4, a generally horizontal section on the line 4—4 of FIG. 2;

FIG. 5, a generally upright section on the line 5—5 of FIG. 2;

FIG. 6, a generally vertical section on the line 6—6 of FIG. 2; and

Figure 7:
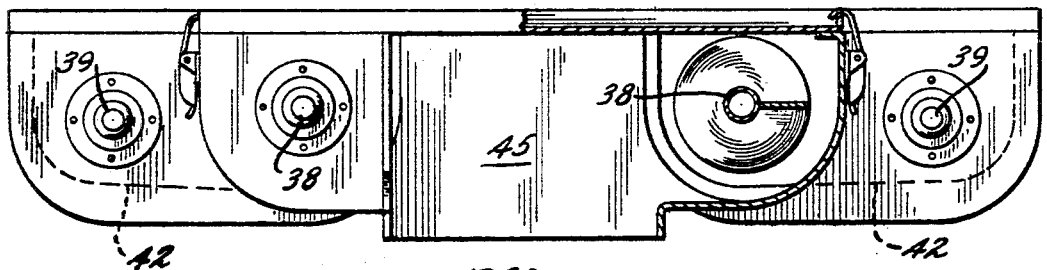

FIG. 7, a generally vertical section on the line 7—7 of FIG. 2.

The stripper head of the present invention is adapted to be mounted on the front of tractor 9, one at each side, with the two properly spaced so that each will receive a stalk of cotton from a row as the machine is moved in the field.

Each stripper comprises a pair of right- and left-hand adjustable grill guides 10 and 11, the right-hand guide being supported by a strap 12, rod 13, and resting on a pillar block 14, while the left-hand guide is supported by strap 15, rod 16, and resting on a pillar blocks 17. The contiguous edges of the guides are disposed in parallel relation and define a space or slot 18 for receiving a stalk of cotton.

At the rear of the guides are mounted inclined right- and left-hand brushes 19 and 20, supported in generally parallel relation with their contiguous portions disposed in relatively close relation so that they will strip off cotton from the stalk. The brushes 19 and 20 have their rear ends substantially higher than their front ends with the latter adapted to be mounted in pillar blocks 17. The brushes 19 and 20 are driven from the power takeoff through a shaft 23 (FIG. 2), a universal joint 24, and a polygonal socket member 25 receiving a complementary polygonal stub shaft 26 fixed to a gear 27 (FIG. 3) which drives a gear 28 attached to the brush 20. The outside brush 19 has a gear 29 driven from the gear 27 by means of an intermediate or idler gear 30. The gears 27 and 30, through universal connections 30', drive the shafts 31 and 32, which drive, through universal connections 33, only one of which is shown (FIG. 3), sprockets 34 and 35 and chains 36 (FIG. 3 and 1). These chains 36 drive lower sprockets 37 on augers or screw conveyors 38 and 39.

These augers or screw conveyors 38 and 39 are generally horizontally disposed and with their rear ends slightly closer together or converging. They extend to the rear of the tractor and are enclosed in housings 40 and 41, the spiral flights of which conveyers are spaced from such housings in a manner not to rupture bolls of cotton being conveyed. The under side of the housings 40 and 41 are provided with transverse slots 65 and trap doors 66 (FIG. 2) mounted on hinges 66' held closed by spring clips 67. The slots 65 allow the discharge of relatively fine trash while the conveyer is in operation and the trap doors 66 allow the cleaning of the interior of the housings; also cover plates 68 and 69 are used on the top of housings 40 and 41 and are held in place by spring clips 70. These cover plates 68 and 69 are provided to protect the augers or conveyors 38 and 39 in case some object gets jammed inside the housings causing the plates to pop off and releasing the pressure on the augers, thus preventing damage to the same. The augers or screw conveyors 38 and 39 receive cotton and cotton bolls from the brushes 19 and 20, which rotate so that their adjacent portions move upwardly to cause the cotton to be carried upwardly and laterally to the respective augers or coveyers.

The cotton carried by such augers or conveyers is discharged at the rear of such augers into right- and left-hand transfer boxes 42 (FIG. 4) connected by pivots 42' to the rear of the tractor or vehicle. In the boxes 42 the cotton is caused to move into engagement with flights of increased diameter 43 of the longer auger 38, thus compensating for the added bulk of the cotton and forcing the same into the discharge chamber 44. Cotton in the discharge chamber 44 is dumped into the hopper 45 (FIG. 7) common to the strippers at both sides of the machine from whence it is removed by a conveyer 46 (FIG. 2).

These strippers, of which there are two, spaced according to the spacing of two rows of cotton, have their upper front ends attached to the tractor in such a manner that they are vertically adjustable about pivots 42' and they are laterally adjustable relative to the tractor 9 by means of horizontal rods 47 (FIGS. 1 and 2). The horizontal rods 47 have their ends attached in brackets 48 and these brackets are provided with spaced openings 48' so that they are disposed in vertical alignment one above the other for mounting the stripper heads at different elevations. The openings 48' receive studs 49 fixed to the sides of the tractor 9 and held by nuts 49'.

The stripper housing frame 51 is provided with spaced lugs 50 and 59 having apertures therein to receive rods 47 by which the front of the strippers are supported from the tractor. The rods 47 have threads 52 adjacent to lugs 50 (FIG. 1) for lateral adjustment of the stripper head toward and from the sides of the tractor by means of adjusting nuts 52'. The stripper heads are maintained in their laterally adjusted position by springs 53 about the outer ends of rods 47 and confined between the outer or remote sides of the lugs 50 and pins 54. This causes the stripper heads to be urged toward and against the adjusting nuts 52' and serving to absorb shock.

The stripper heads are adapted to be relatively adjusted by means of turnbuckles 55 between the lower portions of the frame members 51. In order for the grill guides to be adjusted relative to the ground to be able to pick up the lowermost bolls of cotton, the front end of the stripper is provided with a pair of rounded skirts or fenders 56 and 56' which are reinforced each by a band of metal 57 curved and fixed about the lower edge. The free end of the metal strip 57 is turned back on itself and pivotally connected to the lower part of frame 51 by a stud 58 to a U bracket 59. Also fastened to the lower edge of the skirts or fenders 56 and 56' are the grill guides 10 and 11, adjustably mounted on rods 13 and 16 and pivotally connected at the front by flat boundary strips 12 and 15 so that they may be adjusted toward and from one another by nuts 21 and 22 on rods 13 and 16 to cause a stalk to be guided into opening 18.

In order to keep the leading edges of the guides 10 and 11 in close relation to the ground, levers 60 and 61 (FIGS. 1 and 2) are provided and pivoted to the upper frame wall of the stripper. The levers 60 and 61 are connected to the top of the fenders 56 and 56' through links 63 and pins 63' and when levers 60 and 61 are rotated under spring tension about the pivots 64 they will cause the fenders 56 and 56' to move out or in at the top and pivot about its hinge point 58 at its lower end causing the guides to move toward or away from the ground.

What is claimed is:

1. In a harvester, means for removing cotton in the field comprising a pair of cooperative stripping rolls, means for driving said rolls so that the adjacent surfaces move upwardly and outwardly, screw conveyors mounted outwardly beyond each of said rolls so that the stripped cotton passing upwardly and outwardly from said stripping rolls will fall by gravity into contact with said screw conveyors and be carried rearwardly thereby, a transfer box mounted at the rear portion of said conveyors for communication therewith, one of said conveyors extending rearwardly through and beyond said transfer box to define a single conveyor whereby the cotton deposited in said box will be carried rearwardly by the single conveyor to a common place of discharge.

2. In a harvesting machine having elongated housings in parallel relation to one another and movably attached to a transfer box, said transfer box being fixed to a second box for discharging material therein, the front end of the said housings being adjustable in and away from one another for the receiving of material therein, said elongated housings providing trough-like bases for the inserting of screw-type augers for conveying the material rearwardly to the said transfer box, one of said augers extending beyond said transfer box and terminating in said discharge box, the said auger extending beyond said transfer box having increased diameter flights on said auger from the transfer box to the discharge box so as to accommodate added material from the auger terminating at the transfer box.

3. A vehicle-mounted cotton harvester for picking cotton while moving through a field comprising a pair of elongated conveyors mounted in substantially parallel side-by-side relation and in substantially the same horizontal plane for moving the picked cotton in the same direction, transfer and discharge boxes, said transfer box being mounted to receive harvested cotton from both of said conveyors, one of said conveyors having a portion extending beyond said transfer box to said discharge box, said portion extending beyond said transfer box to said discharge box being of larger size to accommodate cotton supplied to said transfer box by both of said conveyors.

4. The structure of claim 3 in which the conveyors are of the auger or screw type.

5. The structure of claim 3 in which the conveyors are of the auger or screw type and are supported for relative adjustment.

6. The structure of claim 3 in which the conveyors are of the auger or screw type and are mounted for adjustment both in height and proximity.

References Cited

UNITED STATES PATENTS

| | | | |
|---|---|---|---|
| 2,406,058 | 8/1946 | Boone | 56—33 |
| 2,835,095 | 5/1958 | Self | 56—33 |
| 3,171,241 | 3/1965 | Streb | 56—33 |
| 3,173,400 | 3/1965 | Heitshu | 198—64 X |
| 3,200,573 | 8/1965 | Brigman et al. | 56—35 |

F. BARRY SHAY, Primary Examiner

PASQUALE A. RAZZANO, Assistant Examiner

U.S. Cl X.R.

198—64